United States Patent Office 3,328,627
Patented June 27, 1967

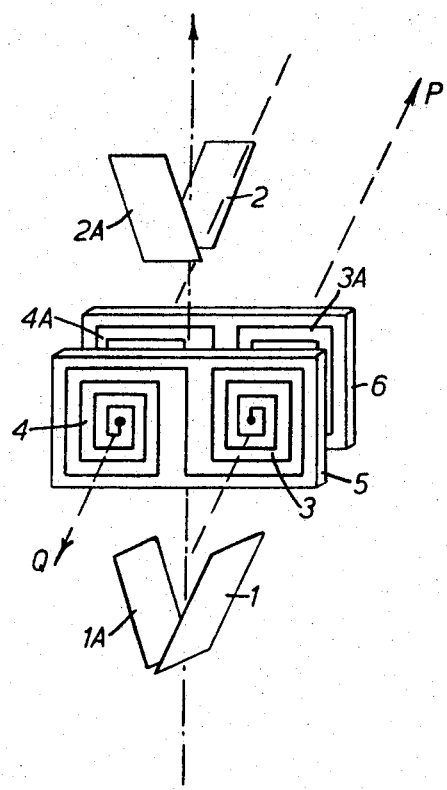

3,328,627
CATHODE RAY TUBES INCLUDING MAGNETIC FIELD PRODUCING DEFLECTION MAGNIFYING MEANS
Jervois Campbell Firmin, Gun Hill, Little Baddow, England, assignor to English Electric Valve Company Limited, London, England, a British company
Filed Sept. 14, 1964, Ser. No. 396,199
Claims priority, application Great Britain, Oct. 15, 1963, 40,550/63
6 Claims. (Cl. 315—3)

ABSTRACT OF THE DISCLOSURE

A cathode ray tube having included therewithin magnetic field producing means for magnifying the ray deflection produced by the deflecting means of the cathode ray tube. The magnetic field producing means produce a pair of equal and opposite magnetic fields symmetrically disposed on opposite sides of the rest position path of the ray and at right angles to the rest position path and the direction of deflection produced by the ray deflecting means.

The magnetic field producing means comprises a plurality of relatively flat coils disposed parallel to the rest position of the ray and to the predetermined direction of deflection. The flat coils comprise first and second pairs of coils, each pair having a common axis and cooperating to provide one of the aforementioned magnetic fields. The coils comprise printed conductors disposed upon insulating carriers.

A first insulating carrier mounts one coil of each of the aforementioned pairs of coils and a second insulating carrier mounts the remaining coils of each of the aforementioned pairs of coils.

---

This invention relates to cathode ray tubes of the kind comprising successive mutually perpendicular pairs of electrostatic deflection plates for causing the ray within the tube to scan a surface therewithin—usually though not necessarily, a fluorescent screen. Though not limited to its application thereto the invention is primarily intended for cathode ray tubes of this kind as employed in measuring and testing instruments.

It is frequently required to provide what is usually termed scan magnification in cathode ray tubes of the kind referred to for use in measuring and testing instruments, that is to say to provide means whereby the deflection of the ray from its undeflected, "rest" position, produced by the application of a given deflection force to one of the pairs of plates is increased by an added deflection force, dependent upon the aforesaid deflection force, applied to the ray after it has passed the deflection plates in question. In normal present day practice such scan magnification is also obtained electrostatically. In the usual present day arrangement the tube has, in the order stated and starting from the gun end of the tube, an electron gun, a pair of deflection plates adapted to produce deflection in the Y direction, a pair of deflection plates adapted to produce deflection in the X direction, a transverse electrostatic screen just beyond (in the direction of ray propagation) the X deflection plates a fluorescent screen at the far end of the tube, and a helical electrode, usually constituted by a high resistance deposit on the inside of the tube envelope, co-axially surrounding the space between the electrostatic screen and the fluorescent screen and to which a suitable accelerating potential is applied. With this arrangement, so long as the ray is undeflected and in its rest position, the axially symmetrical field between the electrostatic screen and the adjacent end of the helical electrode has no deflecting effect but if the ray is deflected from its rest position this field produces an increase in the deflection (as compared with what would occur were the field not present) and there is therefore a scan magnification effect.

This known type of arrangement has the defect that, considering the cathode ray tube as a whole, what may be termed "scan minification" can occur in practice in the X direction (assuming the X plates to be, as stated, those further from the gun) and magnification in both directions is less than that provided by the scan magnifying field itself. This defect occurs because the degree of magnification depends on the relative positions of the centre of deflection and the centre of curvature of the magnifying field, the magnification increasing with increase of the distance of the centre of deflection from the surface to be scanned and being unity when the two centres coincide. In this known type of arrangement there is also a minification superimposed upon the foregoing magnification because the field of the helical electrode causes the ray to follow parabolic paths when deflected by the deflection plates. Indeed in practice the centre of deflection of the X-deflection plates is very close to the centre of deflection of the magnifying field and little or no magnification occurs in the X direction and, in practice, owing to the parabolic paths followed by the electrons there is in practice what may be termed "minification." The present invention seeks to avoid this defect.

According to this invention a cathode ray tube includes an electron gun, successive mutually perpendicular pairs of electrostatic deflection plates between said gun and a surface to be scanned by the ray therefrom and, adjacent the pair of plates with respect to which magnification of deflection is required and beyond the said plates in the direction of ray propagation, means for producing a pair of magnetic fields substantially at right angles both to the direction of ray propagation in the rest position of the ray and to the direction of deflection produced by said pair of plates, said magnetic fields being substantially equal and opposite and symmetrically disposed, one on each side of the direction of ray propagation in the rest position of the ray.

It is possible in carrying out the invention to provide two mutually perpendicular magnetic field producing means, one between the two successive pairs of plates and the other beyond the second pair in the direction of ray propagation. Normally, however, this will not be required and magnetic field producing means between the two successive pairs of plates will be sufficient to meet practical requirements.

Although it is possible to produce the magnetic fields by a permanent magnet system preferably each magnetic field producing means comprises four coils arranged in two pairs, one having a common axis which is on one side of the ray when in its rest position and the other having a common axis parallel to the first and symmetrically positioned on the other side of the ray when in its rest position.

Preferably the four coils are flat coils disposed substantially parallel to the rest position path of the ray and the predetermined direction of deflection and constituted by so-called printed conductors on a pair of insulating parallel spaced carriers between which the ray passes, each pair of coils consisting of two coils one on each carrier, the four coils may be connected in series and wound in such senses that the field due to one pair is substantially equal, opposite and parallel to the field due to the other.

The magnetic scan magnifying means provided by this invention of course renders unrequired the normally provided scan magnifying helical electrode and transverse electrostatic screen close to the deflecting plates of the known tube hereinbefore described and, preferably, there is provided a simple wall coating arranged to be maintained at suitable potential and surrounding the space between the system of deflection plates and the fluorescent screen or other ray receiving surface at the far end of the tube, a transverse electrostatic screen being mounted on the gun side of, and relatively close to, said surface for the purpose of providing post-deflection acceleration and thus making the electron paths approximate more closely to the linear with consequent avoidance of the "minification" produced in the known arrangements as hereinbefore described.

The invention is illustrated in the accompanying drawings which is a purely schematic perspective view illustrating, so far as is necessary to an understanding of the invention, one embodiment. In order to simplify the drawing only the ray deflecting plates, and the scan magnifying magnetic means are shown.

The tube illustrated by the drawing has the customary evacuated envelope (not shown) with an electron gun system (not shown) at one end and a fluorescent screen (not shown) at the other.

The ray deflecting system which is, of course, near the gun end of the tube consists in the usual way of two mutually perpendicular pairs of electrostatic deflection plates 1, 1A, 2, 2A, each pair being effective to deflect the ray in a predetermined direction, the plates of each pair being shown as divergent in accordance with common known practice. The plates 1, 1A are the Y deflection plates and the plates 2, 2A are for X deflection.

Between the successive pairs of electrostatic deflection plates is an electro-magnetic scan magnification system in accordance with this invention and consisting of two pairs of flat coils 3, 3A, 4, 4A in the form of printed coils on insulating sheet supports 5 and 6 between which the ray passes.

The four coils are connected all in series and are wound in such senses that the pair of coils 3, 3A, (one on the support 5 and the other on the support 6) produces a magnetic field whose axis is schematically indicated by the arrow headed broken line P while the other pair of coils 4, 4A, produces an equal magnetic field the axis of which is parallel to the axis P but which is in the opposite direction to the field of the coils 3 and 3A. The second field axis is represented by the arrow-headed broken line Q. The axes P and Q are perpendicular to and symmetrically disposed on either side of the direction of propagation of the ray when in its rest position of the ray (this is represented by an arrow headed chain line in the figure) and are also perpendicular to the direction of deflection produced on the plates 1, 1A.

It will be seen that with this arrangement the coils 3, 3A, 4, 4A produce no deflection effect when the ray is in its rest position. Deflection due to Y deflection voltages applied to the plates 1, 1A, will, however, be magnified by the fields due to the coils 3, 3A, and 4, 4A. Normally the coils will be so shaped and arranged that the total deflection produced will be linearly proportional to the applied Y deflection voltage on the plates 1, 1A. It is obviously a relatively simple matter thus to achieve linear scan magnification as will normally be desired. However if some other law of scan magnification or different degrees of magnification on either side of the axis is required this can be achieved by suitably shaping the coils to give a desired transverse distribution of field strength from the coils.

An electrostatic screen (also not shown) is arranged close in front of the fluorescent screen and clearly such positioning of the screen will result in greater X deflection sensitivity.

I claim:
1. A cathode ray tube including an electron gun for producing a ray, a surface to be scanned by said ray, deflecting means between said gun and said surface for deflecting said ray from its rest position path in a predetermined direction, and magnetic field producing means disposed within the cathode ray tube for magnifying the ray deflection produced by said deflecting means, said magnetic field producing means comprising a plurality of relatively flat coils disposed substantially parallel to the rest position path of the ray and to the predetermined direction of deflection, and being disposed adjacent said deflecing means, intermediate said deflecting means and said surface for producing a pair of equal and opposite magnetic fields symmetrically disposed on opposite sides of the rest position path of said ray and at right angles to the rest position path of the ray and the predetermined direction of deflection.

2. A cathode ray tube according to claim 1 wherein said plurality of relatively flat coils comprise printed conductors disposed upon insulating carrier means.

3. A cathode ray tube according to claim 1 wherein said magnetic field producing means comprises at least four coils, a first of said coils having a first common axis and cooperating to provide one of said pair of magnetic fields, a second pair of said coils having a second common axis parallel to said first common axis and cooperating to provide the other of said magnetic fields parallel to said first magnetic field.

4. A cathode ray tube according to claim 3 wherein said at least four coils comprise printed conductors disposed upon insulating carrier means.

5. A cathode ray tube according to claim 4 wherein said insulating carrier means comprises a first insulating carrier mounting one coil of each of said first and second pairs of coils and a second insulating carrier mounting the other coil of each of said first and second pairs of coils.

6. A cathode ray tube according to claim 5 wherein all of said coils in said first and second pairs are connected in series.

References Cited
UNITED STATES PATENTS

| | | | |
|---|---|---|---|
| 2,177,688 | 10/1939 | Cawein | 313—77 |
| 2,293,539 | 8/1942 | Gray | 313—76 |
| 2,944,174 | 7/1960 | Taylor | 313—77 |
| 2,944,175 | 7/1960 | Taylor | 317—77 |
| 2,998,543 | 8/1961 | Ross | 313—80 |

JAMES W. LAWRENCE, *Primary Examiner.*
ROBERT SEGAL, *Examiner.*